(12) United States Patent
Chen et al.

(10) Patent No.: US 6,417,845 B1
(45) Date of Patent: Jul. 9, 2002

(54) TOUCH CONTROLLED DEVICE WITH PRESSURE SENSING ELECTRONIC INPUT PEN

(75) Inventors: Jung-Yu Chen, Taipei; Johannes Liou; Kevin Sun, both of Taipei Hsien; Wei-Lin Wang, Taipei, all of (TW)

(73) Assignee: ET & T Technology Co., Ltd., Taipei (TW)

( * ) Notice: Subject to any disclaimer, the term of this patent is extended or adjusted under 35 U.S.C. 154(b) by 0 days.

(21) Appl. No.: 09/467,959

(22) Filed: Dec. 21, 1999

(30) Foreign Application Priority Data

Nov. 10, 1999 (TW) .................................... 88219180 U

(51) Int. Cl.[7] ................................................ G09G 5/00
(52) U.S. Cl. ...................... 345/173; 345/179; 178/18.01
(58) Field of Search .............................. 345/173, 179, 345/174, 175, 180; 178/18.01–18.03, 18.05, 18.07, 19.01, 19.04

(56) References Cited

U.S. PATENT DOCUMENTS 5,349,139 A * 9/1994 Verrier et al. ............... 345/179
5,854,448 A * 12/1998 Nozaki et al. ............ 178/18.01
5,969,712 A * 10/1999 Morita et al. ................ 345/179

\* cited by examiner

Primary Examiner—Regina Liang
(74) Attorney, Agent, or Firm—Jacobson Holman, PLLC

(57) ABSTRACT

A touch controlled device with a pressure sensing electronic input pen comprises a main control unit, a pressure signal processing unit, an electronic input pen, a coordinate and button signal processing unit, a touch control panel, and an output interface, etc. The main control unit serves to process the outputting signals from the pressure signal processing unit and the coordinate and button signal processing unit. The electronic input pen has a pressure sensor and a button, the pressure sensor serves to sense the force applied for being outputted with a pressure frequency signal. The touch control panel is connected to the coordinate and button signal processing unit, the tip of the electronic input pen touches the touch control panel so that the touch control panel outputs a coordinate signal and then transfers this signal to the coordinate and button signal processing unit. The coordinate and button signal processing unit processes the control signal from the button of the electronic input pen and the coordinate signal outputted from the touch control panel, the processed signals are transferred to the main control unit and which is transferred to a computer through an output interface.

1 Claim, 6 Drawing Sheets

TOUCH CONTROLLED DEVICE WITH PRESSURE SENSING ELECTRONIC INPUT PEN

FIELD OF THE INVENTION

The present invention relates to a touch controlled device with a pressure sensing electronic input pen, especially to a touch control panel with an electronic input pen, the electronic input pen can output a pressure frequency signal so that the computer software program can present the force of writing.

BACKGROUND OF THE INVENTION

In general, keyboard and mouse are used as an input device between the user and the computer. Keyboard serves to input control signal and data signal. While the mouse serves to control the position of the cursor or input simple control signals.

For general computer software program, keyboard and mouse are sufficient for inputting data. While for a graphic software, the mouse is not a proper input device. Therefore, other hardware operating tools, such as digitizers, touch control screens, touch control panels, etc, which are operated with an electronic input pen, serving to substitute a mouse. Thus, the coordinate signals can be inputted by writing.

Cursors can be controlled with writing through an electronic input pen so that the coordinate signal can be inputted conveniently by the user. While the path signal from the travelling electronic input pen has a fixed width. Although the width can be adjusted through a computer software, this is not exactly the same with the practical handwriting. Thus, it is not as practical and beautiful as handwriting.

Since the electronic input pen used in the touch control screen or touch control panel has no electronic element thereon, in the prior art, only coordinate signal is detected without handwriting signal. This is the main defect in the prior art and is eagerly to be improved.

SUMMARY OF THE INVENTION

Accordingly, the primary object of the present invention is a touch controlled device with a pressure sensing electronic input pen, including a main control unit, a pressure signal processing unit, an electronic input pen, a coordinate and button signal processing unit, a touch control panel, and an output interface, etc. The main control unit serves to calculate the output signals from the pressure signal processing unit and the coordinate and button signal processing unit. The pressure signal processing unit which is connected to the main control unit and can converts the pressure frequency signal from the electronic input pen to count value through a counter, then the electronic input pen is connected to a pressure signal processing unit, the electronic input pen has a pressure sensor and a button, the pressure sensor serves to measure the force applied for being output with a pressure frequency signal. The panel serves to output control signals to the coordinate and button signal processing unit. The coordinate and button signal processing unit is connected to the control signal, processes the control signal from the button of the electronic input pen and the coordinate signal from the touch control panel, then transfers the processed signals to the main control unit. The touch control panel is connected to the coordinate and button signal processing unit, the tip of the electronic input pen touches the touch control panel so that the touch control panel outputs a coordinate signal to the coordinate and button signal processing unit. The output interface is connected to the main control unit. The output interface serves to convert the signals from the main control unit into digital signal which is then transferred to a computer. Since the pressure sensor for measuring the force of the electronic input pen is installed on the electronic input pen, the writing trace and force can be presented.

The various objects and advantages of the present invention will be more easily understood from the following detailed description in conjunction with the appended drawing.

DETAILED DESCRIPTION OF THE PREFERRED EMBODIMENTS

Figure 1:
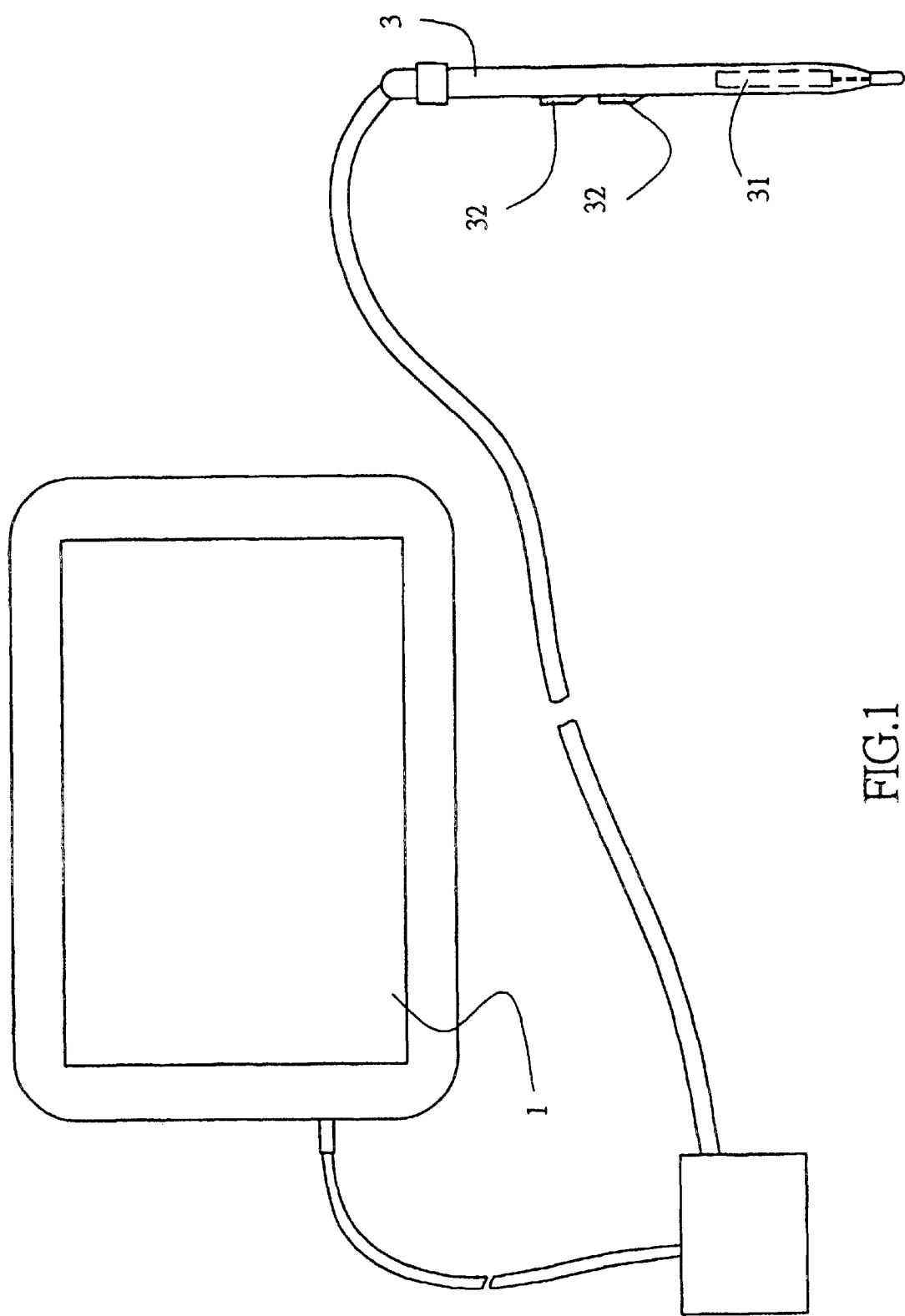
FIG. 1 is a schematic view showing the assembly of the present invention.
Figure 2:
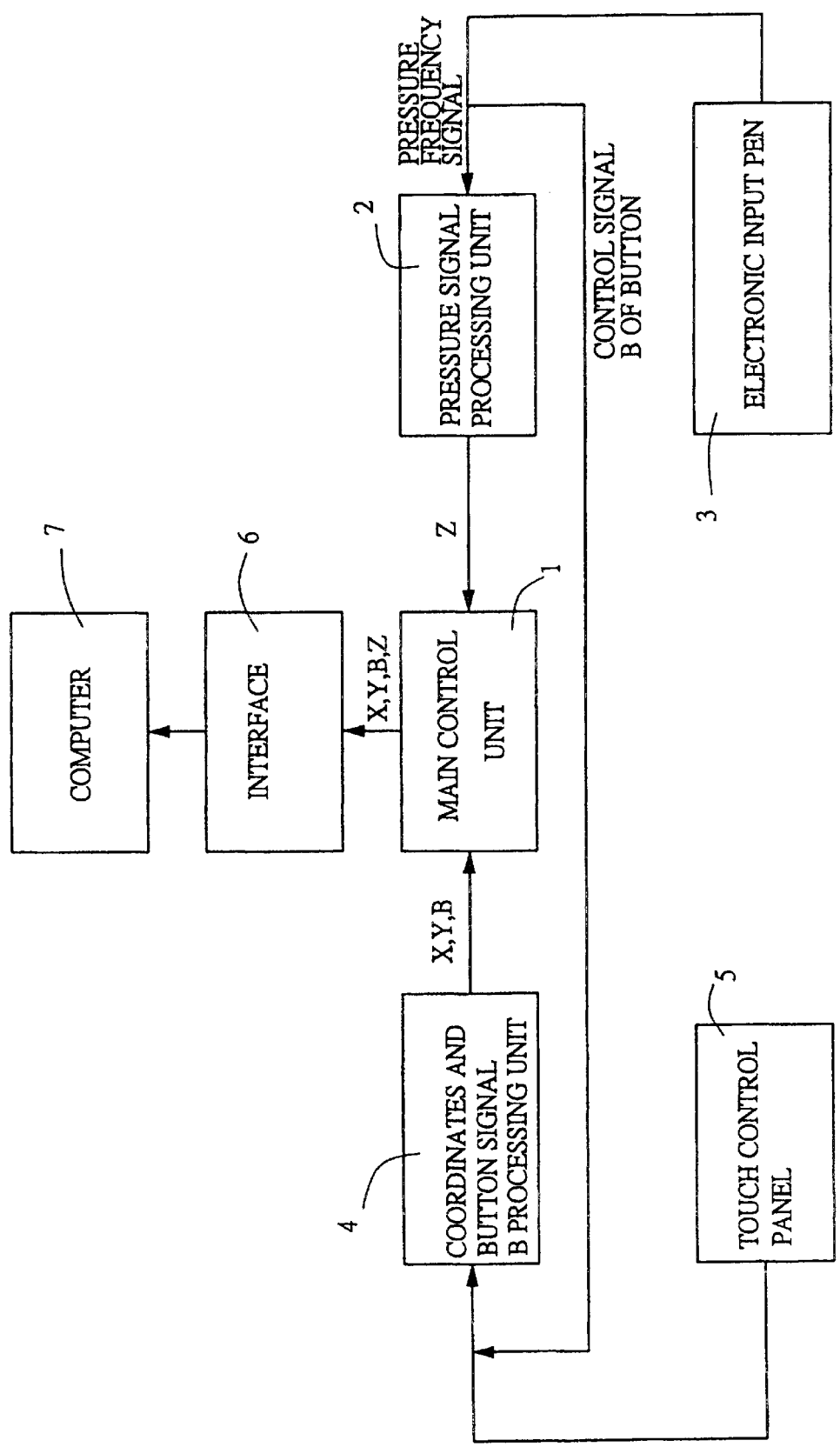
FIG. 2 shows a circuit block diagram of the present invention.

With reference to FIGS. 1 and 2, the touch controlled device with a pressure sensing electronic input pen according to the present invention is illustrated. The touch control device of the present invention is formed primarily by a main control unit 1, a pressure signal processing unit 2, an electronic input pen 3, a coordinate and button signal processing unit 4, a touch control panel 5, and an output interface 6.

The main control unit 1 serves to process the output signals from the pressure signal processing unit 2 and the coordinate and button signal processing unit 4.

The pressure signal processing unit 2 is connected to the main control unit 1. The pressure signal processing unit 2 serves to convert the pressure frequency signal from the said electronic input pen 3 into a counting value through a counter which is a pressure signal, then the signal is delivered to a main control unit 1.

The electronic input pen 3 is connected to the pressure signal processing unit 2. The electronic input pen 3 has a pressure sensor 31 and two buttons 32. The pressure sensor 31 serves to measure an applied force for outputting a pressure frequency signal. The button 32 serves to output an control signal to said coordinate and button signal processing unit 4.

The coordinate and button signal processing unit 4 is connected to the main control unit 1 and serves to process the control signal from the button 32 of the electronic input pen 3 and the coordinate signal from the touch control panel 5, and then deliver the processed signals to the main control unit 1.

The touch control panel 5 is connected to the coordinate and button signal processing unit 4. The tip of the electronic input pen 4 can press upon the touch control panel 5 so that the touch control panel 5 outputs a coordinate signal which is then deliver to the coordinate and button signal processing unit 4.

The output interface 6 is connected to the main control unit 1 and serves to convert the signal from the main control unit 1 into a digital signal for being further transferred to a computer 7.

Figure 3:
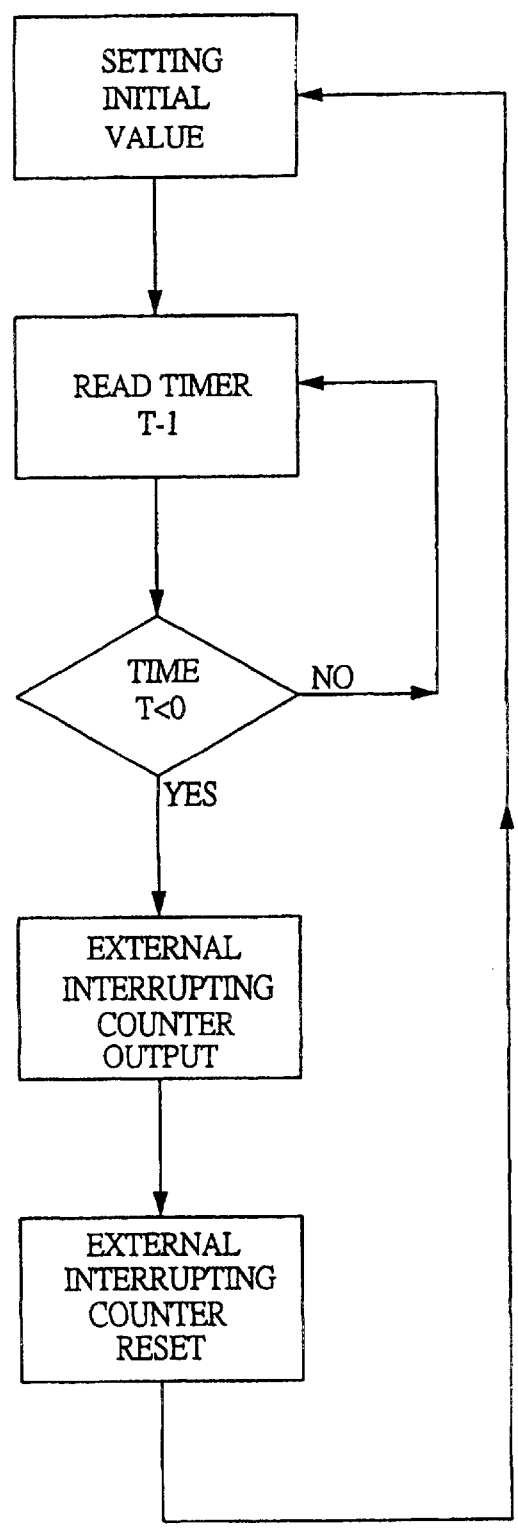
FIG. 3 shows a flow diagram of the pressure signal processing unit according to the present invention.

By aforementioned structure, as the tip of the electronic input pen 3 presses contact the touch control panel 5 for writing or drawing, the pressure sensor 31 will sense the pressure, and then a pressure frequency signal is outputted to the pressure signal processing unit 2. Then, the pressure signal processing unit 2 will operate according to the flow shown in FIG. 3. At first, an initial value T is set, then a time count is read. If T is small than zero, then reading from an external interrupted counter and outputting a counting value, i.e. pressure signal Z. Then, the counter is reset. Then, the process returns to the first step to reset the initial value T. If T is not smaller than zero, the counter is read again, and the value T is subtracted by 1. This is the process that the pressure signal processing unit 2 receives the pressure frequency signal from the electronic input pen 3, then a pressure signal Z is calculated through a count, and then the pressure signal Z is further transferred to a main control unit 1.

Figure 4:
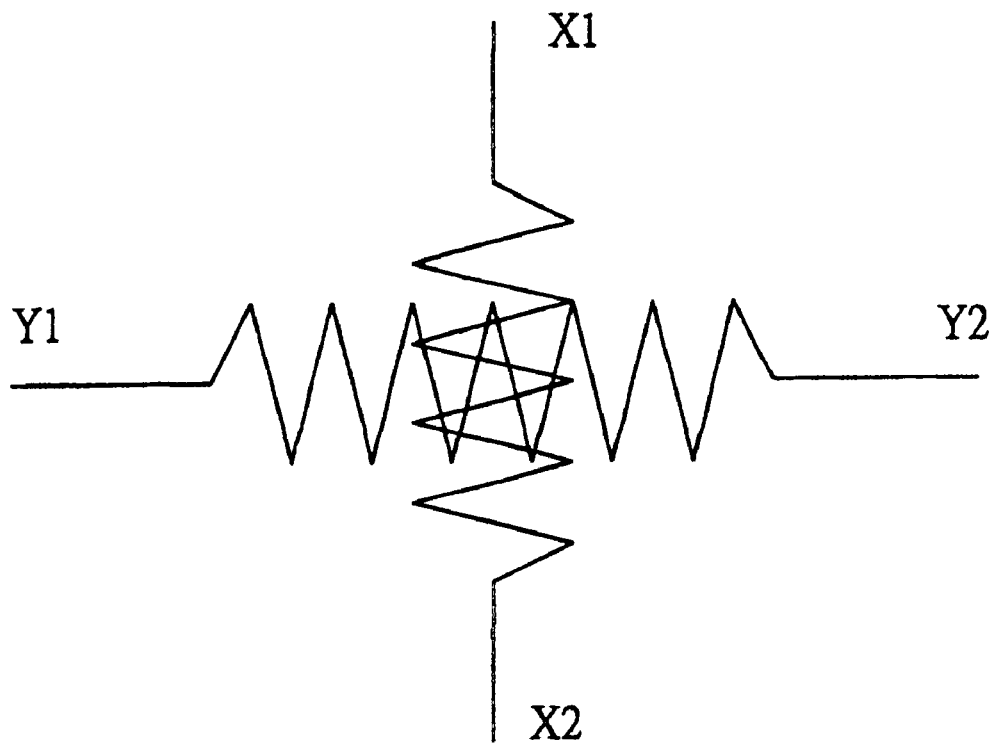
FIG. 4 is a schematic view showing the partial structure for generating coordinates in the touch control panel according to the present invention.
Figure 5:
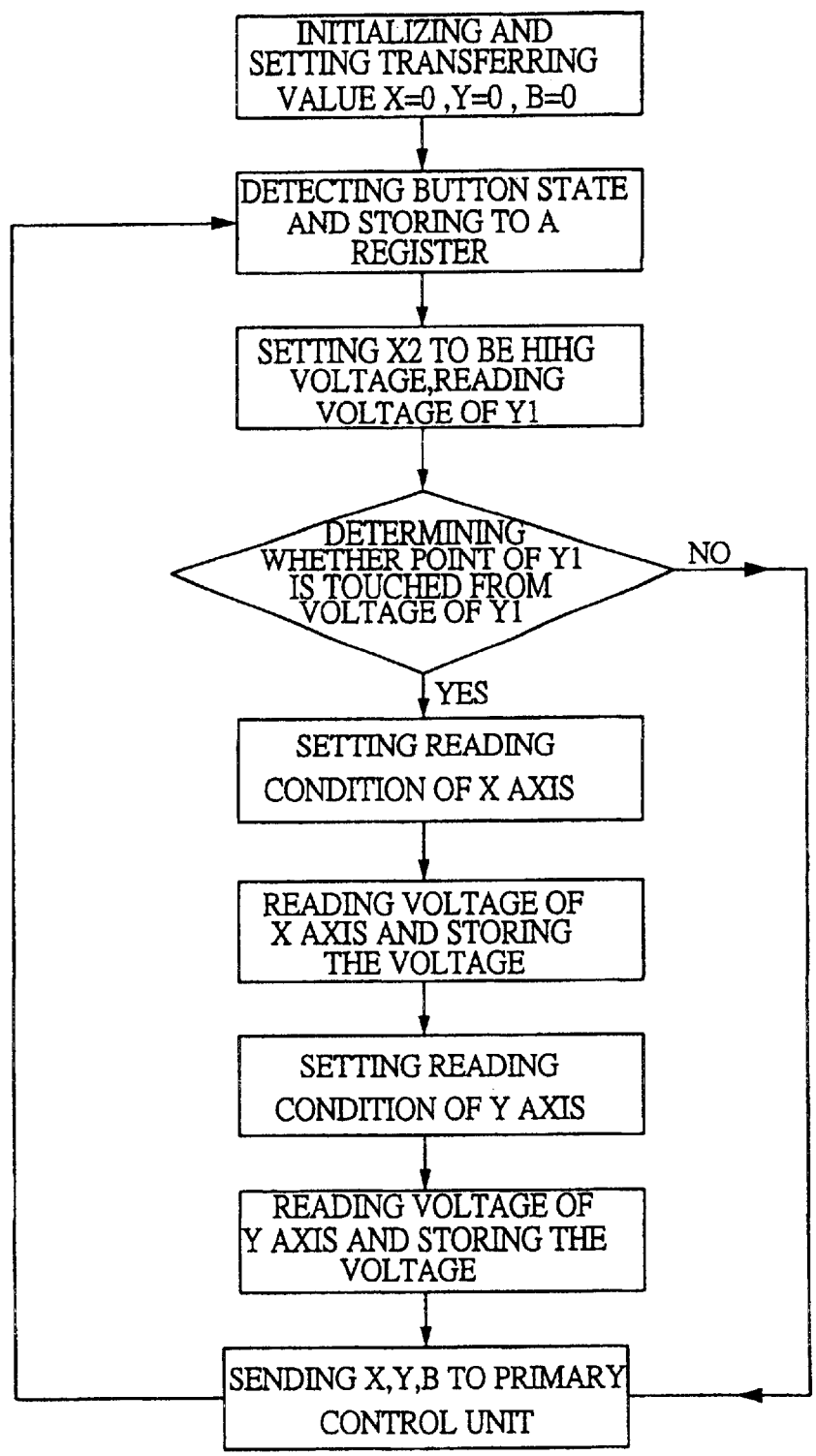
FIG. 5 is a flow diagram of the coordinate and button signal processing unit according to the present invention.

Furthermore, as shown in FIG. 2, the signals (two button signals) from the button 32 of the electronic input pen 3 and the coordinate signal from the electronic input pen 3 pressing contact the touch control panel 5 can be delivered to the coordinate and button signal processing unit 4. As shown in FIG. 4, the structure for forming the coordinates (X, Y) of the touch control panel 5 is illustrated, wherein two resistors are vertically arranged. The way for generating the coordinates of the touch control panel 5 will be described hereafter. FIG. 5 shows the process of the software of the coordinate and button signal processing unit 4. At first, the system is initialized, the coordinates X and Y is set as zero and the control signal B of the button 32 of the electronic input pen 3 is also set as zero. Then the control signal B of the button 32 is detected. Then, the detected value is stored in a register. Then setting the X2 in X axis is a high voltage, and reading the voltage value of Y1 in Y axis. Then, determining whether the coordinate Y1 is a point touched by the electronic input pen. If yes, setting the reading condition of X axis, i.e. at first, setting Y2 to a high voltage, and Y1 to a low voltage. Then, measuring the voltage component of X1, which is the state value of X axis, and then storing this state value. Next, setting the reading condition of Y axis, and then storing this reading condition. Finally, transferring the coordinate signals of X and Y from the touch control panel 5 and the control signal B of the button 32 to the main control unit 1. Then, returning the process to the steps of detecting the control signal B of the button. Furthermore, if the voltage of Y1 is appeared that the point of this coordinate is not touched, then the process performs the step of outputting signals to the main control unit 1 without performing the step of setting X axis and Y axis.

Figure 6:
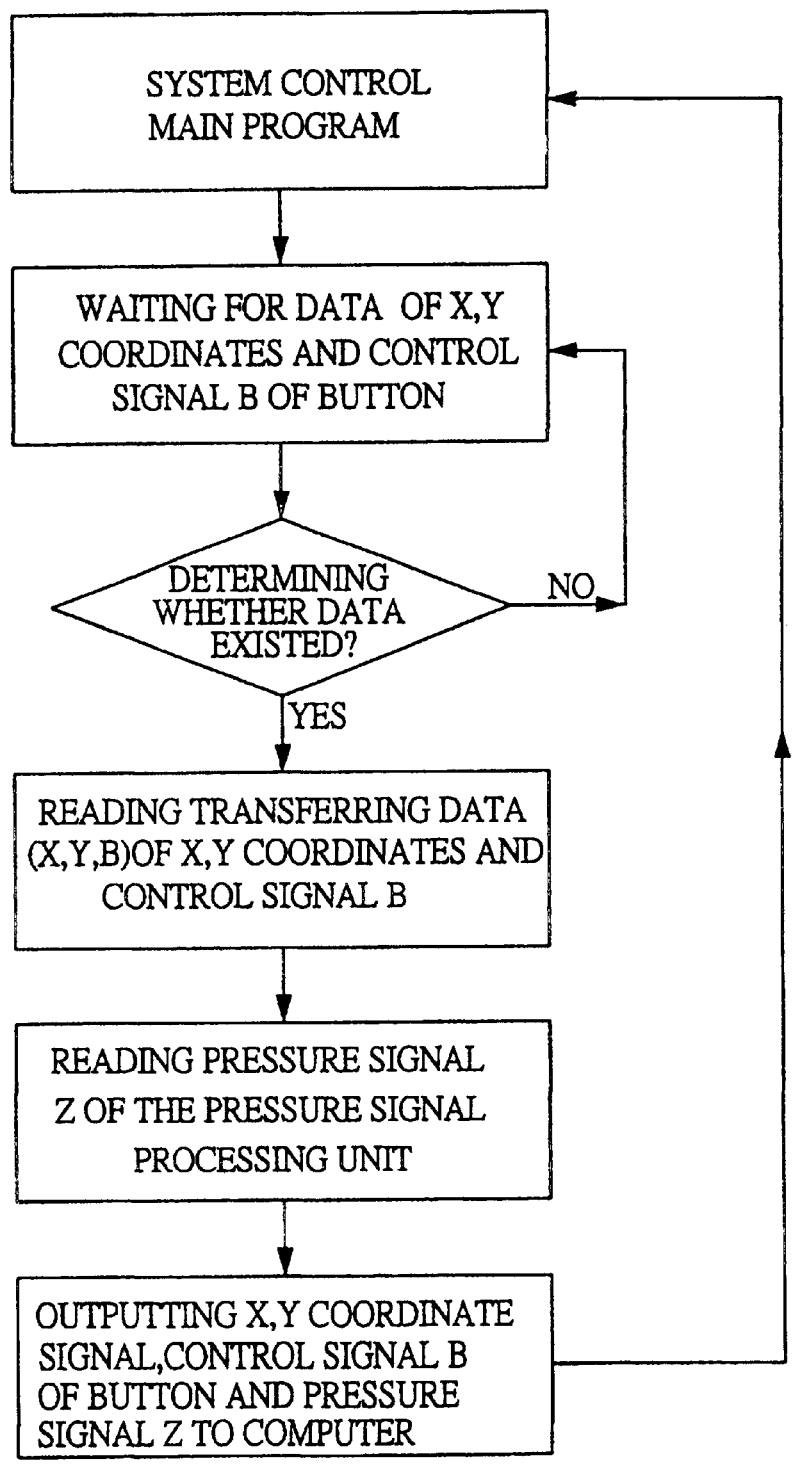
FIG. 6 is a flow diagram of the main control unit of the present invention.

The process of the software of the main control unit 1 is illustrated in FIG. 6. In the process, the system control primary program firstly waits for the X and Y coordinate signals from the coordinate and button signal processing unit 4 and the data of the control signal B from the button 32 of the electronic input pen 3. Then, it determines whether aforesaid data is existed, if no input data, the process returns to previous step to wait for the input data. Inversely, if there are input data of X and Y axes and the control signal B, then these data are read, and then the pressure signal from the pressure signal processing unit 2 is read, and then these signals are summarized. Then by the output interface 6, the coordinate signal of X and Y axes, control signal B and pressure signal Z are sent to the computer 7.

Since the electronic input pen 3 has a pressure sensor 31, by using the touch control panel 5, a pressure signal Z can be obtained so that the writing trace and force in writing or drawing can be identified by the graphic program of the computer. Then these data is stored in the computer.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A touch controlled device with a pressure sensing electronic input pen comprising:

a main control unit, a pressure signal processing unit, an electronic input pen, a coordinate and button signal processing unit, a touch control panel, and an output interface, said main control unit to process output signals from said pressure signal processing unit and said coordinate and button signal processing unit;

said pressure signal processing unit connected to the main control unit to convert a pressure frequency signal from said electronic input pen to a count value through a counter to become a pressure signal sent to a primary control unit;

said electronic input pen connected to said pressure signal processing unit, and having a pressure sensor and buttons, said pressure sensor serving to sense an applied force outputted with a pressure frequency signal; said buttons serving to output control signals to said coordinate and button signal processing unit;

said coordinate and button signal processing unit receiving said control signal, and processing said control signal outputted from said buttons of said electronic input pen and said coordinate signal from said touch control panel, and transferring said processed signals to said main control unit;

said touch control panel connected to said coordinate and button signal processing unit, and a tip of said electronic input pen for touching said touch control panel with said touch control panel outputting a coordinate signal and transferring said coordinate signal to said coordinate and button signal processing unit; and said output interface connected to said main control unit to convert signals from said main control unit into digital signals which are transferred to a computer.

* * * * *